Nov. 3, 1953         C. A. BRANCKE         2,658,153

PRIME MOVER STARTING AND SHUTDOWN SYSTEM

Filed June 21, 1952

Inventor:
Carl A. Brancke,
by Rowell P. Snack
His Attorney.

Patented Nov. 3, 1953

2,658,153

UNITED STATES PATENT OFFICE 2,658,153

PRIME MOVER STARTING AND SHUTDOWN SYSTEM

Carl A. Brancke, North East, Pa., assignor to General Electric Company, a corporation of New York Application June 21, 1952, Serial No. 294,808

25 Claims. (Cl. 290—4)

This invention relates to a system for starting up and shutting down a thermal prime mover, for example, a gas turbine, and has particular application in connection with such a prime mover used on a self-propelled vehicle.

In conventional diesel-electric locomotives, the diesel prime mover is started by either injecting compressed air into the cylinders or cranking the diesel by means of a cranking motor energized by batteries in a manner similar to the starting of an automotive gasoline engine. A gas turbine, however, must be cranked to a much higher speed than a diesel in order to become self-sustaining, i. e. until the energy developed by the turbine is sufficient to operate the compressor. The cranking of gas turbines utilized in central station applications presents no problem since there is adequate commercial power available to crank the turbine with a cranking motor. In the gas turbine-electric locomotive, however, space and weight limitations prohibit providing sufficient battery capacity for directly cranking the turbine and it is also not feasible to crank it with compressed air. It is, therefore, necessary in the design of gas turbine-electric locomotives to provide auxiliary means for cranking the gas turbine. Since the gas turbine in a gas turbine-electric locomotive drives one or more direct current traction generators, it has been found feasible to energize one of these traction generators as a motor for cranking the turbine and this energization may be provided by an auxiliary thermal prime mover, such as a small diesel engine driving an auxiliary generator.

In order to start the gas turbine utilizing a separate auxiliary diesel-driven generator to energize one of the turbine-driven traction generators as a motor to crank the turbine, it has been found desirable to first crank the turbine to firing speed, then inject the fuel, and finally to disconnect the diesel-driven auxiliary generator from the traction generator when the turbine reaches idling speed. In order to provide continuous battery charging without the necessity for operating the auxiliary diesel after cranking is completed, a second auxiliary generator is provided mechanically driven by the gas turbine and it is, therefore, necessary to transfer battery charging from the diesel generator to the auxiliary generator and to shut down the diesel when the turbine has successfully reached idling speed. It has further been found desirable initially to inject a high grade fuel, such as diesel fuel into the turbine for starting and after the turbine has reached idling speed, to transfer to a lower grade fuel, such as Bunker C fuel oil. While the starting equipment for a Central Station gas turbine may be reasonably complicated, in the case of the gas turbine-electric locomotive, it is necessary to provide simplified supervisory control means for initiating the various steps in the starting and shutdown sequence, and further, it is desirable that the engineman be restrained from advancing the control to the next position unless the required operating conditions have been met in the present control position.

An object of this invention is, therefore, to provide an improved starting and shutdown system for a thermal prime mover wherein the above enumerated features are incorporated.

Further objects and advantages of this invention will become apparent and the invention will be better understood by reference to the following description and the accompanying drawing and the features of novelty which characterize this invention will be pointed out with particularity in the claims annexed to and forming a part of this specification.

In accordance with this invention, there is provided a thermal prime mover, such as a gas turbine mechanically connected to drive a main generator, such as one of the traction generators of a gas turbine-electric locomotive, and an auxiliary generator. An auxiliary thermal power prime mover, such as a diesel is also provided mechanically connected to drive another auxiliary generator. In order to start the main prime mover, the auxiliary prime mover is first started in any conventional manner, as for example by a cranking motor energized from the locomotive batteries. Circuit establishing means are provided for connecting the auxiliary prime mover driven generator to the main generator in order to operate it as a motor to crank the turbine. Two sources of fuel are provided, such as diesel fuel and Bunker C fuel with valves respectively arranged to inject the two types of fuel into the prime mover. Supervisory control means, such as a drum controller, is provided arranged to sequentially connect the auxiliary prime mover-driven generator to the main generator, to actuate the first fuel valve to admit the first type of fuel to the main prime mover, and to actuate the second fuel valve to admit the second type of fuel to the main prime mover. In order to prevent the engineman from advancing the controller to successively higher positions before the required operating conditions have been filled, means responsive to the speed of the auxiliary prime mover are provided to prevent advancing the controller to the position to actuate the circuit establishing means unless the auxiliary prime mover is operating at a predetermined speed. Further, means responsive to the turbine speed are provided to prevent the engineman from advancing the controller to the position in which the first fuel valve is actuated unless the main prime mover is being cranked at a first predetermined speed. Since it is not desirable to inject the low grade fuel into the turbine unless it is operating at idling speed, a third means responsive to the speed of the main prime mover is provided preventing operation of the controller to the position in which the second fuel valve is actuated unless the turbine has reached idling speed and this speed responsive means also disconnects the auxiliary prime mover-driven generator from the main generator when idling speed is reached. With the main prime mover idling on the low grade fuel, the controller may then be advanced to transfer battery charging from the auxiliary prime mover-driven generator to the main prime mover-driven auxiliary generator and subsequently to stop the auxiliary prime mover.

In order to shut down the main prime mover, the engineman moves the supervisory control means back from the last position to actuate the auxiliary prime mover starting means and transfer battery charging from the main prime mover-driven auxiliary generator to the auxiliary prime mover-driven generator. Moving the supervisory control means back another step shuts off the low grade fuel from the main prime mover and again injects the high grade fuel. Moving the controller again another step shuts off all fuel from the main prime mover and permits it to coast until a low predetermined speed is reached at which one of the speed responsive means reconnects the auxiliary prime mover-driven generator to the main generator to crank the main prime mover for cool-down. After a sufficient period of cool-down cranking, moving the controller again disconnects the auxiliary prime mover-driven generator from the main generator to stop the cool-down cranking and reconnects the auxiliary prime mover-driven generator to the battery for charging. Moving the controller to the off position stops the auxiliary-prime mover.

The single figure of the drawing schematically illustrates the improved thermal prime mover starting and shutdown system of this invention.

Figure 1:
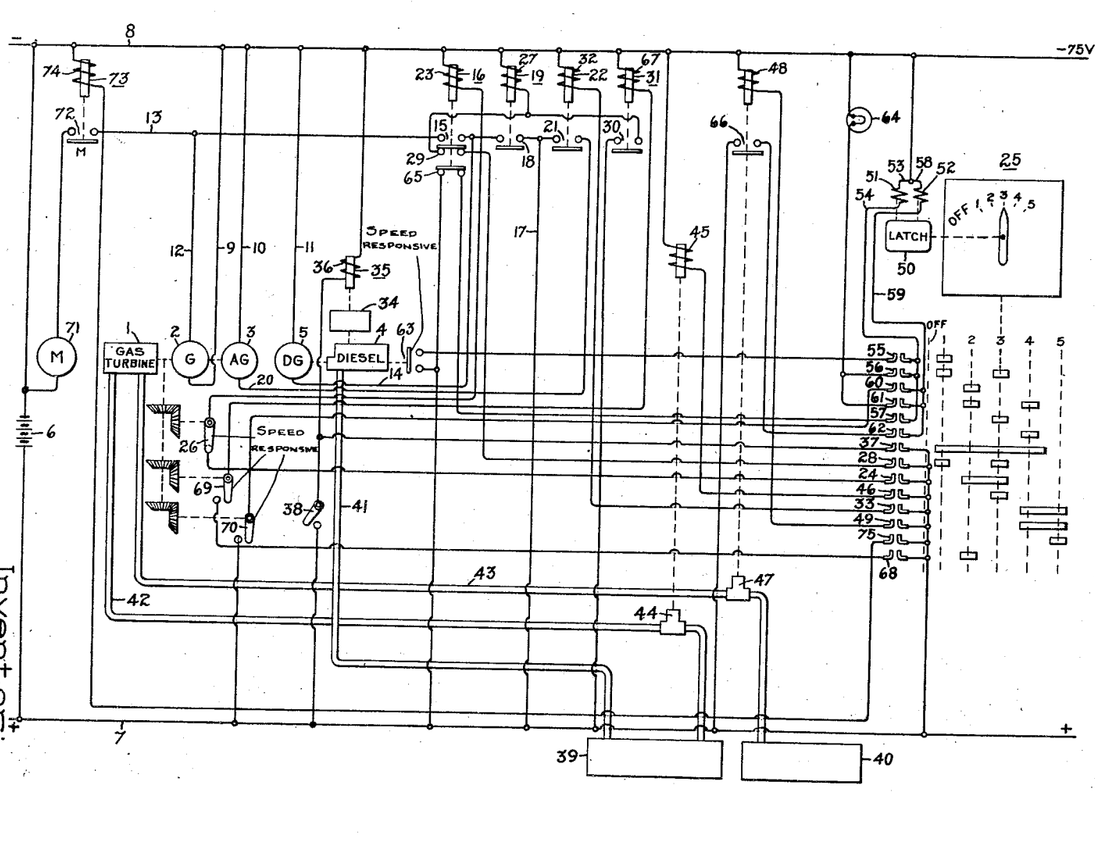

Referring now to the drawing, there is shown a main thermal prime mover, such as a locomotive gas turbine 1 mechanically connected to drive at least one main traction generator 2 and an auxiliary generator 3. An auxiliary thermal prime mover, such as a diesel 4, is provided mechanically connected to drive another auxiliary generator 5. The excitation systems for generators 2, 3 and 5 form no part of this invention and are not shown. The control power for the system is provided by battery 6 connected respectively to positive line 7 and negative line 8. The main generator 2, turbine driven auxiliary generator 3, and diesel driven auxiliary generator 5 are respectively connected to negative control line 8 by lines 9, 10 and 11 with main generator 2 having its other line 12 connected to a bus 13. The other side 14 of diesel-driven generator 5 is connected to bus 13 through normally open contacts 15 of relay 16 and is also connected to control line 7 through lines 17 and normally open contacts 18 of diesel battery charging relay 19. It will thus be readily seen that when the contacts 15 of relay 16 are closed, the diesel-driven generator 5 and the main generator 2 are connected in a loop circuit so that the main generator 2 is being operated as a motor to crank the turbine 1. It will also be readily seen that when the contact 18 of relay 19 is closed, the diesel driven generator 5 is connected across the control lines 7 and 8 for charging the battery 6. The other side 20 of turbine driven auxiliary generator 3 is also connected to the control line 7 through line 17 and normally open contacts 21 of auxiliary battery charging relay 22.

Operating coil 23 of relay 16 is connected between control line 8 and contacts 24 of controller 25 with normally closed contacts 26 of turbine driven speed responsive switch being interposed in series therewith. Operating coil 27 of diesel battery charging relay 19 has one side connected to control line 8 and its other side connected to contacts 28 of controller 25 through normally closed contacts 29 of relay 16. Operating coil 27 of diesel battery charging relay 19 is also connected to the other control line 7 through normally open contacts 30 of cool-down relay 31. Operating coil 32 of auxiliary battery charging relay 22 is connected between control line 8 and contacts 33 of controller 25. It will be readily seen that when contacts 21 of auxiliary battery charging relay 22 are closed, the turbine driven auxiliary generator 3 will be connected across control lines 7 and 8 for charging battery 6 and that when contacts 30 of cool-down relay 31 are closed, the operating coil 27 of diesel battery charging relay 19 is directly connected across control lines 7 and 8 shorting out contact 29 of relay 16 and contact 28 of controller 25.

The diesel 4 is provided with any conventional starting arrangement, shown here schematically at 34, such as a conventional starting motor which might be energized from battery 6. The starting means 34 is in turn actuated in any conventional manner by a diesel operating relay 35 having its operating coil 36 connected to control line 8 and contacts 37 of controller 25. For manually starting diesel 4, operating coil 36 of diesel operating relay 35 is also connected to control line 7 through manual starting switch 38. It will be readily understood that when the operating coil 36 of diesel operating relay 35 is energized, the starting means 34 will start the diesel 4 and it will operate as long as operating coil 36 is energized. When operating coil 36 is de-energized, however, the diesel 4 will stop.

Two fuel tanks 39 and 40 respectively are schematically shown, tank 39 supplying diesel fuel to diesel 4 through fuel line 41 and to the turbine 1 through fuel line 42. The fuel tank 40 supplies low grade fuel to the turbine 1, for example, Bunker C fuel oil, through fuel line 43. A solenoid actuated valve 44 is provided in the line 42 with its operating coil 45 connected between control line 8 and contacts 46 of controller 25. Solenoid actuated valve 47 is provided in fuel line 43 with its operating coil 48 connected between control line 8 and contacts 49 of controller 25. It will now be readily seen that with contacts 37 of controller 25 closed, the diesel operating relay 35 will be energized starting diesel 4. With contacts 28 of controller energized, and before relay 16 is energized, contacts 29 thereof will be closed energizing diesel battery charging relay 19 to place diesel generator 5 across lines 7 and 8 to charge battery 6. When contacts 24 of controller 25 are closed, relay 16 will be energized closing contacts 15 placing diesel generator 5 in a loop circuit with main generator 2 to crank turbine 1 and opening contacts 29 to de-energize diesel battery charging relay 19 to disconnect diesel generator 5 from its battery charging connection. When contacts 46 of controller 25 are closed, diesel fuel operating coil 45 will be energized operating valve 44 to admit diesel fuel to the gas turbine 1 and when the turbine reaches a predetermined speed, speed responsive switch 26 will open de-energizing relay 16, opening contact 15 and closing contact 29. Thus, the diesel generator 5 is disconnected from the main generator 2 and diesel battery charging relay 19 is again energized closing contacts 18 to place diesel generator 5 across lines 7 and 8 to charge battery 6. When contacts 49 of controller 25 are closed, Bunker C fuel operating coil 48 is energized opening valve 47 to admit Bunker C fuel to the gas turbine 1.

In order to insure that the controller 25 is not moved to successive positions until the required operating characteristics are obtained in the previous position, latching device 50 is provided having coils 51 and 52. With this arrangement, controller 25 cannot be moved from position 1 to position 2 unless coil 51 is energized, from position 2 to 3 unless coil 52 is energized, from position 3 to position 4 unless coil 51 is again energized, and from position 4 to 5 unless coil 52 is again energized. Such latching arrangements are commercially available and therefore no further description of the latch 50 will be given here. The side 53 of the latch coil 51 is connected to control line 8 while the side 54 is connected to contacts 55, 56 and 57 of controller 25. The side 58 of latch coil 52 is also connected to the control line 8 and the other side 59 is connected to contacts 60, 61 and 62 of controller 25. The other side of the contact 55 is connected to the other control line 7 through normally open contacts of a diesel-driven speed responsive switch 63. The other sides of contacts 56 and 61 are respectively connected to control line 8 through pilot light 64. The other side of contact 57 is connected to the other control line 7 through normally closed contacts 65 of relay 16. The other side of the contact 62 is connected to the other control line 7 through normally open contacts 66 on Bunker C fuel valve 48.

The operating coil 67 of cool-down relay 31 is connected between control line 8 and contacts 68 of controller 25 through the normally open contacts of turbine driven speed responsive switch 69. The other side of contact 60 of controller 25 is connected to the other control line 7 through a normally open contact of turbine driven speed responsive switch 70. One traction motor 71 is shown schematically connected between line 8 and bus 13 through normally open contacts 72 of power contactor 73. The operating coil 74 of power contactor 73 is connected between line 8 and contacts 75 of controller 25. The other sides of contacts 37, 28, 24, 46, 33, 49, 75 and 68 of controller 25 are respectively connected to control line 7.

The controller 25 may be of the conventional type in which a plurality of cam surfaces actuates the contacts, shown here as having five positions in addition to an off position. In the cam development shown, none of the contacts were closed in the off position while contacts 55, 56, 37 and 28 are closed in position 1, contacts 60, 61, 37, 24 and 68 are closed in position 2, contacts 56, 57, 37, 28, 24 and 46 are closed in position 3, contacts 61, 62, 37, 33 and 49 are closed in position 4, and contacts 33, 49 and 75 are closed in position 5.

In operation, the system functions in the following manner. With the entire system shut down, it is first necessary to start the diesel 4. To do this, the engineman advances the controller 25 from the off position to the first position in which contacts 37 are closed energizing diesel operating relay 35 to operate starting device 34. In the alternative, the diesel 4 may have been manually started by closing the switch 38, as for example for battery charging alone. Contacts 28 are also closed in the first position and since relay 16 is not energized so that its contact 29 is closed, diesel battery charging relay 19 is energized closing its contact 18 placing the diesel generator 5 across the battery 6 for charging. When the diesel comes up to a predetermined speed, the diesel speed switch 63 will close and since contacts 55 and 56 are closed in the first position of controller 25, latch coil 51 is energized releasing the latch 50 on the controller 25 and pilot light 64 is lighted. Releasing the latch 50 permits the engineman to move controller 25 to the second position. It will now be seen that if the diesel 4 fails to start or to come up to the desired speed, the controller cannot be further operated to call for cranking the turbine.

When the engineman moves controller 25 to the second position, contacts 55 and 56 are opened de-energizing the latch 51 and extinguishing the pilot light 64. Contacts 37 are still closed in the second position so that the diesel operating relay 35 is still energized and the diesel 4 still running. In this position, contacts 28 are opened, therefore de-energizing diesel battery charging relay 19 opening its contact 18 to remove the diesel generator 5 from the battery 6. Contacts 24 are closed in the second position and since the turbine speed switch 26 is closed relay 16 is energized closing contact 15 to connect diesel generator 5 to the main generator 2 to operate the generator as a motor for cranking the turbine 1. As will be hereinafter described, the turbine speed switch 26 will open at a predetermined upper speed, for example 70% of full speed, and drop out at a much lower speed, for example, 5% of full speed. With the system thus far described, the turbine 1 is being cranked by the diesel generator 5 energizing the main generator 2 as a motor, however, fuel has not yet been introduced. Turbine speed switch 70 is set to pick up, i. e. close at a predetermined low speed, for example 10% of full speed and to drop out at a still lower speed, for example 5% of full speed. Therefore, when the turbine cranking reaches 10% of full speed, turbine speed switch 70 will close and since contacts 60 and 61 of controller 25 are closed in the second position, latch coil 52 will be energized releasing the latch 50 to permit the controller to be moved to the third position and the pilot light 64 will again be lighted.

In the third position of controller 25, contacts 37 are still closed so the diesel operating relay 35 is still energized and the diesel 4 is still running. At the time of entering the third position, the turbine speed has not yet reached the pickup point of the turbine speed switch 26 so that switch will still be closed and since contacts 24 are closed, relay 16 is still energized connecting the diesel generator 5 to the main generator 2 through contact 15 for cranking the turbine 1. Contacts 46 of controller 25 are closed in the third position energizing operating coil 45 of diesel fuel valve 44 to inject diesel fuel in the turbine 1. When the predetermined pick-up setting of turbine speed switch 26 is reached, for example, 70% of full speed, this switch opens de-energizing relay 16 opening contact 15 and closing contact 29 thus disconnecting the diesel generator 5 from main generator 2 to cease cranking and energizing diesel battery charging relay 19 closing contact 18 and placing the diesel generator 5 across the battery 6 charging. Dropping out of the relay 16 closes contact 65 and since contacts 57 and 56 of controller 25 are closed in the third position, latch coil 51 is again energized releasing latch 50 to permit controller 25 to be moved to the fourth position and the pilot light 64 is again illuminated.

When the engineman moves the controller 25 to the fourth position, contacts 37 are still closed energizing the diesel operating relay 35 so that the diesel 4 is still running. Contacts 28 of the controller 25 have opened in the fourth position so that diesel battery charging relay 19 is de-energized opening contact 18 to disconnect the diesel generator 5 from the battery 6. Contacts 33 of controller 25 have closed, however, in the fourth position thus energizing auxiliary battery charging relay 22 closing contacts 21 placing auxiliary generator 3 across the battery 6 for charging and thus effecting transfer of battery charging from diesel generator 5 to auxiliary generator 3. Contacts 46 of controller 25 are now open in the fourth position de-energizing diesel fuel valve operating coil 45 to close valve 44 thus shutting off diesel fuel from the turbine 1. However, contacts 49 have closed thus energizing Bunker C fuel valve operating coil 48 opening fuel valve 47 to admit Bunker C fuel to the turbine 1. The energization of Bunker C fuel valve operating coil 48 closes contacts 66 and since contacts 62 and 61 of controller 25 are closed in the fourth position, latch coil 52 will be energized releasing latch 50 to permit controller 25 to be moved to the fifth position and the pilot light 64 will again be energized.

In the fifth position, contacts 37 are no longer closed thus de-energizing diesel operating relay 35 to shut down the diesel 4. Contacts 49 are closed in the fifth position thus energizing Bunker C fuel valve operating coil 48 causing Bunker C to be supplied to the turbine and contacts 33 are closed energizing auxiliary battery charging relay 22 closing contacts 21 so that the auxiliary turbine driven generator 3 continues to charge the battery 6. In this position, contacts 75 close energizing relay 73 closing contacts 72 to permit the engineman to enter motoring.

To summarize the starting sequence described above, the diesel 4 is first started and connected to the battery for charging. If the diesel starts and comes up to a predetermined speed, the diesel speed switch 63 closes energizing the latch to permit the controller to be moved to the second position. In the second position, the diesel generator is connected to the turbine generator for cranking and if the turbine can be cranked up to a predetermined speed, for example 10%, turbine speed switch 70 will close energizing the latch to permit the controller 25 to be moved to the third position. In the third position, diesel fuel is injected into the turbine and if the turbine accelerates to a higher predetermined speed, for example 70% of full speed, the turbine speed switch 26 will open disconnecting the diesel generator from the main generator and reconnecting the diesel generator for battery charging. Opening of the turbine speed switch 26 at the predetermined speed also effects energization of the latch permitting the controller to be moved to the fourth position in which battery charging is transferred from the diesel generator to the auxiliary generator and the turbine fuel is transferred from diesel type to Bunker C. After these transfers, the latch again permits movement of the controller to the fifth position in which the diesel is shut down and the operator is permitted to enter the motoring connections. It will thus be readily seen that unless the diesel starts, the engineman cannot advance to the second position, unless the turbine is cranked up to 10% speed, the engineman cannot enter the third position; unless the turbine reaches 70% speed, the engineman cannot enter the fourth position, and the fifth position cannot be entered until the turbine is running on Bunker C fuel.

To shut down the turbine, the engineman moves the controller 25 from the fifth position to the fourth position thus opening contacts 75 de-energizing relay 73 to disconnect the motor 71 from the generator 2. Contacts 49 are still closed in the fourth position thus Bunker C fuel valve operating coil 48 is still energized and Bunker C is still supplied to the turbine. Contacts 33 are still closed and thus auxiliary battery charging relay 22 is still energized and contacts 21 are still closed so the auxiliary generator 3 is still charging the battery. However, contacts 37 close energizing diesel operating coil 35 to start the diesel 4. It should be here noted that the latch 50 only functions during the starting sequence and does not prohibit movement of the controller 25 toward the off position.

Moving the controller 25 to the third position opens contacts 49 de-energizing Bunker C fuel valve operating coil 48 to close valve 47 and shutting off a supply of Bunker C fuel from the turbine 1. Contacts 46 are closed in the third position energizing diesel fuel valve operating coil 45 to open valve 44 and again admit diesel fuel to the turbine 1. Contacts 33 are now open de-energizing auxiliary battery charging relay 22 opening contacts 21 to disconnect the auxiliary generator 3 from the battery 6. Contacts 24 are closed in the third position, however, the turbine 1 is still running at high speed on diesel fuel so the turbine speed switch 26 is still open and thus relay 16 is not energized. The turbine speed switch 26, as noted hereinbefore, is preferably set to pick up, i. e. open at a predetermined high speed, for example, 70% of full speed, and drop out, i. e. close at a predetermined low speed, for example 5% of full speed. Since relay operating coil 16 is not energized, its contact 29 is closed and since contacts 28 of controller 25 are closed in the third position, diesel battery charging relay 19 will be energized closing its contact 18 to place diesel generator 5 across battery 6, thus completing the transfer of battery charging from the auxiliary generator 3 to the diesel generator 5.

Moving the controller 25 back to the second position opens contacts 46 de-energizing diesel fuel valve operating coil 45 to close valve 44 thus shutting off diesel fuel from the turbine 1 and initiating deceleration. It will be here noted that in the second position, contacts 28 are open and therefore diesel battery charging relay 19 will normally be de-energized disconnecting the diesel generator 5 from the battery 6. However, in the shutting down sequence, the turbine is at this point still operating at a speed substantially above the 5% dropout speed of turbine speed switch 26 and thus since it is unnecessary to connect the diesel generator 5 to the main generator 2 for cool-down cranking, it is desirable that the generator be connected to the battery 6 charging. To effect this connection, contacts 69 are closed in the second position. Turbine speed switch 69 is preferably arranged to pick up at a speed intermediate the pickup speeds of switches 26 and 70, for example, 15% of full speed and to drop out at a very low speed, for example 1% of full speed. Thus, when the second position is entered, the turbine will be operating well above the drop-out speed of turbine speed switch 69 and thus the switch will be closed energizing cool-down relay 31 closing contact 30 to energize diesel battery charging relay 19 through its contact 18 and thus connect the diesel generator 5 to the battery 6 for charging. When the turbine speed drops to the drop-out point of turbine speed switch 26, it may be desirable to initiate cool-down cranking to prevent warping of the turbine shaft, and closing of the switch 26 energizes relay 16 through contacts 24 of controller 25 to close contact 15 and thus connect diesel generator 5 to the main generator 2 for cranking.

Moving the controller 25 to the first position opens contacts 24 thus de-energizing the relay 16 and opening the contacts 15 to disconnect the diesel generator 5 from the main generator 2 to stop the cool-down cranking, the accompanying closing of contacts 29 energizing diesel battery charging relay 19 to close contact 18 and connect the diesel generator 5 across the battery 6 for charging. The contacts 68 are open in the first position thus dropping out cool-down relay 31 and since contacts 28 of controller 25 are now closed, diesel battery charging relay 19 will be energized through contacts 29 placing diesel generator 5 across the battery 6 for charging. It will be noted that contacts 37 have been closed from the fourth to the first position energizing diesel operating relay 35 so that the diesel 4 is still operating and charging the battery. Moving the controller 25 to the off position opens all of the contacts thus de-energizing diesel battery charging relay 19 disconnecting the diesel generator 5 from the battery 6 and de-energizing diesel operating relay 35 and stopping the diesel 4.

To summarize the shutdown sequence described hereinabove, the traction motors are first disconnected from the generator and the diesel is started. Fuel is next transferred from Bunker C to diesel type and battery charging is transferred from the auxiliary generator to the diesel generator. Diesel fuel is next shut off initiating the deceleration of the turbine and when the turbine speed drops to the drop-out setting of turbine speed switch 26, i. e. 5%, the turbine generator 2 is again connected to the diesel generator 5 to provide cool-down cranking of the turbine. After a sufficient period of cool-down cranking, the diesel generator is then disconnected from the turbine generator and the diesel generator continues to run charging the battery. Lastly, the diesel is shut down completing the shut down sequence.

It will now be readily apparent that this improved starting and shutdown system is characterized by its simplicity, only one supervisory control device being utilized to initiate all of the sequential operations of starting and shut down, an essential feature when the gas turbine is utilized in a locomotive. Further, the system provides safety features which prevent the operator from attempting to advance the controller to the next position unless the requisite operating conditions have been filled in the previous position. Furthermore, the system provides for cool-down cranking in the shut down sequence. While a manually operated controller 25 has been shown, it will be readily understood that a pilot motor-driven controller may be energized through lines 54 and 59 replacing the latch coils 51 and 52 to provide the step-by-step operation. Further, the turbine speed switches 26, 69 and 70 have been shown most schematically, it being readily apparent that any device responsive to the speed of the turbine may be utilized to operate these switches, for example, centrifugal mechanisms, tachometer generators, or current responsive devices. Furthermore, while controller 25 is shown as having five positions, a larger or smaller number of positions may be utilized. For example, positions two and three may be combined to simplify the operating sequence.

While I have illustrated and described a particular embodiment of this invention, further modifications and improvements will occur to those skilled in the art. I desire it to be understood, therefore, that this invention is not limited to the specific form shown and I intend in the appended claims to cover all modifications which do not depart from the spirit and scope of this invention.

What I claim as new and desire to secure by Letters Patent of the United States is:

1. A system for starting and shutting down a main thermal prime mover having a main generator mechanically connected thereto comprising an auxiliary thermal prime mover mechanically connected to drive an auxiliary generator, a source of fuel for said main prime mover, means for starting said auxiliary prime mover, first circuit establishing means arranged electrically to connect said auxiliary generator to said main generator for operating the same as a motor to crank said main prime mover, valve means arranged to connect said main prime mover to said source of fuel, speed responsive circuit establishing means arranged to disconnect said auxiliary generator from said main generator responsive to a predetermined speed of said main prime mover, and supervisory control means arranged sequentially to actuate said first circuit establishing and valve means for starting said main prime mover and to deactuate said last-enumerated means in reverse sequence for shutting down said main prime mover.

2. A system for starting and shutting down a main thermal prime mover having a main generator mechanically connected thereto comprising an auxiliary thermal prime mover mechanically connected to drive an auxiliary generator, a source of fuel for said main prime mover, means for starting said auxiliary prime mover, first circuit establishing means arranged electrically to connect said auxiliary generator to said main generator for operating the same as a motor to crank said main prime mover, first speed responsive circuit establishing means connected to render ineffective said first circuit establishing means when said auxiliary prime mover is operating below a predetermined speed, valve means arranged to connect said source of fuel to said main prime mover, second speed responsive circuit establishing means connected to render ineffective said valve means when said main prime mover is being cranked below a first predetermined speed, and third speed responsive circuit establishing means arranged to disconnect said auxiliary generator from said main generator responsive to a second predetermined main prime mover speed.

3. A system for starting and shutting down a main thermal prime mover having a main generator mechanically connected thereto comprising an auxiliary thermal prime mover mechanically connected to drive an auxiliary generator, a source of a first type fuel for said main prime mover, a source of second type fuel for said main prime mover, means for starting said auxiliary prime mover, first circuit establishing means arranged electrically to connect said auxiliary generator to said main generator for operating the same as a motor to crank said main prime mover, first valve means arranged to connect said source of said first type of fuel to said main prime mover, speed responsive circuit establishing means arranged to disconnect said auxiliary generator from said main generator responsive to a predetermined speed of said main prime mover, second valve means arranged to connect said source of said second type of fuel to said main prime mover, and supervisory control means arranged sequentially to actuate said first circuit establishing and first and second valve means for starting said main prime mover and to deactuate said last-enumerated means in reverse sequence for shutting down said main prime mover.

4. A system for starting and shutting down a main thermal prime mover having a main generator mechanically connected thereto comprising an auxiliary thermal prime mover mechanically connected to drive an auxiliary generator, a source of a first type fuel for said main prime mover, a source of second type fuel for said main prime mover, means for starting said auxiliary prime mover, first circuit establishing means arranged electrically to connect said auxiliary generator to said main generator for operating the same as a motor to crank said main prime mover, first speed responsive circuit establishing means connected to render ineffective said first circuit establishing means when said auxiliary prime mover is operating below a predetermined speed, first valve means arranged to connect said source of said first type of fuel to said main prime mover, second speed responsive circuit establishing means connected to render ineffective said first valve means when said main prime mover is cranked below a first predetermined speed, third speed responsive circuit establishing means arranged to disconnect said auxiliary generator from said main generator responsive to a second predetermined speed of said main prime mover, and second valve means arranged to connect said source of said second type of fuel to said main prime mover, said third speed responsive circuit establishing means being connected to render ineffective said second valve means below said second predetermined speed of said main prime mover.

5. A system for starting and shutting down a main thermal prime mover having a main generator mechanically connected thereto comprising an auxiliary thermal prime mover mechanically connected to drive an auxiliary generator, a source of fuel for said main prime mover, a battery, means for starting said auxiliary prime mover, first circuit establishing means arranged when actuated to electrically connect said auxiliary generator to said main generator for operating the same as a motor to crank said main prime mover and when deactuated to connect said auxiliary generator to said battery for charging, valve means arranged to connect said source of fuel to said main prime mover, speed responsive circuit establishing means arranged to deactuate said first circuit establishing means to disconnect said auxiliary generator from said main generator and to reconnect said auxiliary generator to said battery responsive to a predetermined speed of said main prime mover, and supervisory control means arranged sequentially to actuate said first circuit establishing and valve means for starting said main prime mover and to deactuate said last-enumerated means in reverse sequence for shutting down said main prime mover.

6. A system for starting and shutting down a main thermal prime mover having a main generator mechanically connected thereto comprising a first auxiliary generator mechanically connected to said main prime mover, an auxiliary thermal prime mover mechanically connected to drive a second auxiliary generator, a battery, a source of fuel for said main prime mover, operating means arranged when actuated to start and run said auxiliary prime mover and when deactuated to stop the same, first circuit establishing means arranged when actuated to electrically connect said second auxiliary generator to said main generator for operating the same as a motor to crank said main prime mover and when deactuated to connect said second auxiliary generator to said battery for charging, valve means arranged to connect said source of fuel to said main prime mover, speed responsive circuit establishing means arranged to deactuate said first circuit establishing means to disconnect said second auxiliary generator from said main generator and to reconnect said second auxiliary generator to said battery responsive to a predetermined main prime mover speed, second circuit establishing means arranged to disconnect said second auxiliary generator from said battery and to connect said first auxiliary generator thereto, and supervisory control means arranged to sequentially actuate said first circuit establishing, valve and second circuit establishing means for starting said main prime mover, said supervisory control means being arranged to deactuate said operating means after actuation of said second circuit establishing means to stop said auxiliary prime mover, said supervisory control means being arranged respectively to actuate and deactuate said operating, second circuit establishing means, valve and first circuit establishing means in reverse sequence for stopping said main prime mover.

7. A system for starting and shutting down a main thermal prime mover having a main generator mechanically connected thereto comprising an auxiliary thermal prime mover mechanically connected to drive an auxiliary generator, a source of fuel for said main prime mover, means for starting said auxiliary prime mover, first circuit establishing means arranged electrically to connect said auxiliary generator to said main generator for operating the same as a motor to crank said main prime mover, valve means arranged to connect said main prime mover to said source of fuel, speed responsive circuit establishing means arranged to disconnect said auxiliary generator from said main generator responsive to a predetermined speed of said main prime mover, and supervisory control means arranged sequentially to actuate said first circuit establishing and valve means for starting said main prime mover and to deactuate said last-enumerated means in reverse sequence for shutting down said main prime mover, said speed responsive circuit establishing means being arranged to reconnect said auxiliary generator to said main generator for cranking said main prime mover when said main prime mover speed falls below a second predetermined value.

8. A system for starting and shutting down a main thermal prime mover having a main generator mechanically connected thereto comprising an auxiliary thermal prime mover mechanically connected to drive an auxiliary generator, a source of fuel for said main prime mover, a battery, means for starting said auxiliary prime mover, first circuit establishing means arranged electrically to connect said auxiliary generator to said main generator for operating the same as a motor to crank said main prime mover, valve means arranged to connect said source of fuel to said main prime mover, a second circuit establishing means arranged electrically to connect said auxiliary generator to said battery, first speed responsive circuit establishing means arranged to deactuate said first circuit establishing means to disconnect said auxiliary generator from said main generator and to actuate said second circuit establishing means to connect said auxiliary generator to said battery responsive to a predetermined speed of said main prime mover, supervisory control means arranged sequentially to actuate said first circuit establishing and valve means for starting said main prime mover and to deactuate said last-enumerated means in reverse sequence for stopping said main prime mover, said first speed responsive circuit establishing means being arranged to reactuate said first circuit establishing means to reconnect said auxiliary generator to said main generator for cool-down cranking of said main prime mover when said main prime mover falls below a second predetermined speed lower than said first predetermined speed, and a second speed responsive circuit establishing means arranged to connect said auxiliary generator to said battery when said supervisory control means is positioned to reactuate said first circuit establishing means for cool-down cranking but said first speed responsive circuit establishing means has not reactuated said first circuit establishing means.

9. A system for starting and shutting down a main thermal prime mover having a main generator mechanically connected thereto comprising an auxiliary thermal prime mover mechanically connected to drive an auxiliary generator, a source of fuel for said main prime mover, operating means arranged when actuated to start and run said auxiliary prime mover, a circuit establishing device arranged when actuated electrically to connect said auxiliary generator to said main generator for operating the same as a motor to crank said main prime mover, a valve device arranged when actuated to connect said source of fuel to said main prime mover, supervisory control means arranged in a first position to actuate said circuit establishing device and in a second position to actuate said valve device for starting said main prime mover, said supervisory control means being arranged to deactuate said devices in reverse sequence for stopping said main prime mover, first speed responsive means arranged to prevent movement of said supervisory control means to said first position until said auxiliary prime mover reaches a predetermined speed, second speed responsive means arranged to prevent movement of said supervisory control means to said second position until said main prime mover reaches a first predetermined speed, and third speed responsive means arranged to deactuate said circuit establishing device to disconnect said auxiliary generator from said main generator responsive to a predetermined second speed of said main prime mover.

10. A system for starting and shutting down a main thermal prime mover having a main generator mechanically connected thereto comprising an auxiliary thermal prime mover mechanically connected to drive an auxiliary generator, a source of a first type of fuel for said main prime mover, a source of a second type of fuel for said main prime mover, operating means arranged when actuated to start and run said auxiliary prime mover, a circuit establishing device arranged when actuated electrically to connect said auxiliary generator to said main generator for operating the same as a motor to crank said main prime mover, a first valve device arrangement when actuated to connect said source of said first type of fuel to said main prime mover, a second valve device arranged when actuated to connect said source of said second type of fuel to said main prime mover, supervisory control means arranged in a first position to actuate said circuit establishing device, in a second position to actuate said first valve means, and in a third position to actuate said second valve means for starting said main prime mover, said supervisory control means being arranged to deactuate said devices in reverse sequence for shutting down said main prime mover, first speed responsive means arranged to prevent movement of said supervisory control means to said first position until said auxiliary prime mover reaches a predetermined speed, second speed responsive means arranged to prevent movement of said supervisory control means to said third position until said main prime mover reaches a first predetermined speed, and third speed responsive means arranged to deactuate said circuit establishing device to disconnect said auxiliary generator from said main generator responsive to a predetermined second speed of said main prime mover, said third speed responsive means being arranged to prevent movement of said supervisory control means to said third position until said main prime mover reaches said second predetermined speed.

11. A system for starting and shutting down a main thermal prime mover having a main generator mechanically connected thereto comprising a first auxiliary generator mechanically connected to said main prime mover, an auxiliary thermal prime mover mechanically connected to drive a second auxiliary generator, a battery, a source of fuel for said main prime mover, an operating device arranged when actuated to start and run said auxiliary prime mover and when deactuated to stop auxiliary prime mover, a first circuit establishing device arranged when actuated electrically to connect said second auxiliary generator to said main generator for operating the same as a motor to crank said main prime mover, a valve device arranged when actuated to connect said source of fuel to said main prime mover, a second circuit establishing device arranged when actuated electrically to connect said second auxiliary generator to said battery for charging, a third circuit establishing device arranged when actuated electrically to connect said first auxiliary generator to said battery for charging; supervisory control means arranged in a first position to actuate said second circuit establishing device, in a second position to deactuate said second circuit establishing device and actuate said first circuit establishing device, in a third position to actuate said valve device, in a fourth position to deactuate said second circuit establishing device and actuate said third circuit establishing device, and in a fifth position to deactuate said starting and running device, said supervisory control means being arranged respectively to deactuate and actuate said devices in reverse sequence for shutting down said main prime mover, first speed responsive means arranged to prevent movement of said supervisory control means to said second position until said auxiliary prime mover reaches a predetermined speed, second speed responsive means arranged to prevent movement of said supervisory control means to said third position until said main prime mover reaches a first predetermined speed, and third speed responsive means arranged to deactuate said first circuit establishing device and to actuate said second circuit establishing device responsive to a second predetermined main prime mover speed, said third speed responsive means being arranged to prevent movement of said supervisory control means to said fourth position until said main prime mover reaches said second predetermined speed.

12. A system for starting and shutting down a main thermal prime mover having a main generator mechanically connected thereto comprising an auxiliary thermal prime mover mechanically connected to drive an auxiliary generator, a source of fuel for said main prime mover, operating means connected when energized to start and run said auxiliary prime mover, and a circuit controller having a plurality of contacts, one of said contacts connecting said auxiliary generator to said main generator for operating the same as a motor to crank said main prime mover in a first predetermined number of positions of said controller, and a second of said contacts connecting said source of fuel to said main prime mover in a second predetermined number of positions of said controller, said first contact disconnecting said auxiliary generator from said main generator in a third predetermined number of positions of said controller.

13. A system for starting and shutting down a main thermal prime mover having a main generator mechanically connected thereto comprising an auxiliary thermal prime mover mechanically connected to drive an auxiliary generator, a source of fuel for said main prime mover, operating means connected when energized to start and run said auxiliary prime mover, a circuit establishing device arranged when energized to connect said auxiliary generator to said main generator for operating the same as a motor to crank said main prime mover, a valve device arranged when energized to connect said source of fuel to said main prime mover, a circuit controller having a plurality of contacts for sequentially connecting said devices for energization to start said main prime mover and for disconnecting said devices in reverse sequence for shutting down said main prime mover, one of said contacts connecting said circuit establishing device for energization in a first predetermined number of positions of said controller and a second of said contacts connecting said valve device for energization in a second predetermined number of positions of said controller, and speed responsive means arranged to de-energize said circuit establishing device responsive to a predetermined speed of said main prime mover.

14. A system for starting and shutting down a main thermal prime mover having a main generator mechanically connected thereto comprising an auxiliary thermal prime mover mechanically connected to drive an auxiliary generator, a source of fuel for said main prime mover, operating means connected when energized to start and run said auxiliary prime mover, a circuit establishing device arranged when energized to connect said auxiliary generator to said main generator for operating the same as a motor to crank said main prime mover, a valve device arranged when energized to connect said source of fuel to said main prime mover, a circuit controller having a plurality of contacts for sequentially connecting said devices for energization to start said main prime mover and for disconnecting said devices in reverse sequence for shutting down said main prime mover, one of said contacts connecting said circuit establishing device for energization in a first predetermined number of positions of said controller and a second of said contacts connecting said valve device for energization in a second predetermined number of positions of said controller, first speed responsive means arranged to prevent movement of said controller to said first predetermined number of positions until said auxiliary prime mover reaches a predetermined speed, second speed responsive means arranged to prevent movement of said supervisory control means into said second predetermined number of positions until said main prime mover reaches a first predetermined speed, and third speed responsive means arranged to deactuate said circuit establishing device to disconnect said auxiliary generator from said main generator responsive to a predetermined second speed of said main prime mover.

15. A system for starting and shutting down a main thermal prime mover having a main generator mechanically connected thereto comprising an auxiliary thermal prime mover mechanically connected to drive an auxiliary generator, a source of first type of fuel for said main prime mover, a source of a second type of fuel for said main prime mover, operating means connected when energized to start and run said auxiliary prime mover, a circuit establishing device arranged when energized to connect said auxiliary generator to said main generator for operating the same as a motor to crank said main prime mover, a first valve device arranged when energized to connect said source of said first type of fuel to said main prime mover, a second valve device arranged when energized to connect said source of said second type of fuel to said main prime mover, a circuit controller having a plurality of contacts for sequentially connecting said devices for energization to start said main prime mover and for disconnecting said devices in reverse sequence for shutting down said main prime mover, one of said contacts connecting said circuit establishing device for energization in a first predetermined number of positions of said controller, a second of said contacts connecting said first valve device for energization in a second predetermined number of positions of said controller, a third of said contacts connecting said second valve device for energization in a third predetermined number of positions of said controller, and speed responsive means arranged to de-energize said circuit establishing devices responsive to a predetermined speed of said main prime mover.

16. A system for starting and shutting down a main thermal prime mover having a main generator mechanically connected thereto comprising an auxiliary thermal prime mover mechanically connected to drive an auxiliary generator, a source of first type of fuel for said main prime mover, a source of a second type of fuel for said main prime mover, operating means connected when energized to start and run said auxiliary prime mover, a circuit establishing device arranged when energized to connect said auxiliary generator to said main generator for operating the same as a motor to crank said main prime mover, a first valve device arranged when energized to connect said source of said first type of fuel to said main prime mover, a second valve device arranged when energized to connect said source of said second type of fuel to said main prime moved, a circuit controller having a plurality of contacts for sequentially connecting said devices for energization to start said main prime mover and for disconnecting said devices in reverse sequence for shutting down said main prime mover, one of said contacts connecting said circuit establishing device for energization in a first predetermined number of positions of said controller, a second of said contacts connecting said first valve device for energization in a second predetermined number of positions of said controller, a third of said contacts connecting said second valve device for energization in a third predetermined number of positions of said controller, first speed responsive means furnished to prevent movement of said controller to said first predetermined number of positions until said auxiliary prime mover reaches a predetermined speed, second speed responsive means arranged to prevent movement of said controller into said second predetermined number of positions until said main prime mover reaches a first predetermined speed, and third speed responsive means arranged to prevent movement of the said controller into said third predetermined number of positions until said prime mover reaches a second predetermined speed, said third speed responsive means being arranged to deactuate said circuit establishing device to disconnect said auxiliary generator from said main generator responsive to said predetermined second speed of said main prime mover.

17. A system for starting and shutting down a main thermal prime mover having a main generator mechanically connected thereto comprising a first auxiliary generator mechanically connected to said main prime mover, an auxiliary thermal prime mover mechanically connected to drive a second auxiliary generator, a battery, a source of fuel for said main prime mover, an operating device arranged when energized to start and run said auxiliary prime mover and when de-energized to stop said auxiliary prime mover, a first circuit establishing device arranged when energized electrically to connect said second auxiliary generator to said main generator for operating the same as a motor to crank said main prime mover, a valve device arranged when energized to connect said source of fuel to said main prime mover, a second circuit establishing device arranged when energized electrically to connect said second auxiliary generator to said battery for charging, a third circuit establishing device arranged when energized electrically to connect said first auxiliary generator to said battery for charging, a circuit controller having a plurality of contacts for sequentially connecting said devices for energization to start said main prime mover and for disconnecting said devices in reverse sequence for shutting down said main prime mover, one of said contacts connecting said second circuit establishing device for energization in a first predetermined number of positions of said controller, a second of said contacts connecting said first circuit establishing device for energization in a second predetermined number of positions of said controller, a third of said contacts connecting said valve device for energization in a third predetermined number of positions of said controller, a fourth of said contacts connecting said third circuit establishing device for energization in a fourth predetermined number of positions of said controller, and a fifth of said contacts disconnecting said starting and running device in a fifth predetermined number of position of said controller, and speed responsive means arranged to de-energize said first circuit establishing device responsive to a predetermined speed of said main prime mover.

18. A system for starting and shutting down a main thermal prime mover having a main generator mechanically connected thereto comprising an auxiliary thermal prime mover mechanically connected to drive an auxiliary generator, a source of fuel for said main prime mover, a battery, means for starting said auxiliary prime mover, first circuit establishing means arranged electrically to connect said auxiliary generator to said main generator for operating the same as a motor to crank said main prime mover, a valve device arranged when energized to connect said source of fuel to said main prime mover, a second circuit establishing device arranged when energized electrically to connect said auxiliary generator to said battery, a circuit controller having a plurality of contacts for sequentially connecting said devices for energization to start said main prime mover and for disconnecting said devices in reverse sequence for shutting down said main prime mover, one of said contacts connecting said first circuit establishing device for energization in a first predetermined number of positions of said controller, a second of said contacts connecting said valve for energization in a second predetermined number of positions of said controller, a third of said contacts connecting said second circuit establishing means for energization in a third predetermined number of steps of said controller, first speed responsive means arranged to de-energize said first circuit establishing device to disconnect said auxiliary generator from said main generator and to energize said second circuit establishing device to connect said auxiliary generator to said battery responsive to a predetermined speed of said main prime mover, said first speed responsive means being arranged to de-energize said first circuit establishing device to reconnect said auxiliary generator to said main generator for cool down cranking of said main prime mover when said main prime mover falls below a second predetermined speed lower than said first predetermined speed, and a second speed responsive means arranged to connect said auxiliary generator to said battery when said circuit controller is positioned to re-energize said first circuit establishing means for cool-down cranking but said first speed responsive means has not re-energized said first circuit establishment means.

19. A system for starting and shutting down a main thermal prime mover having a main generator mechanically connected thereto comprising an auxiliary thermal prime mover mechanically connected to drive an auxiliary generator, a source of fuel for said main prime mover, operating means connected when energized to start and run said auxiliary prime mover, a circuit establishing device arranged when energized to connect said auxiliary generator to said main generator for operating the same as the motor to crank said main prime mover, a valve device arranged when energized to connect said source of fuel to said main prime mover, a circuit controller having a plurality of contacts for sequentially connecting said devices for energization to start said main prime mover and for disconnecting said devices in reverse sequence for shutting down said main prime mover, one of said contacts connecting said circuit establishing device for energization in a first predetermined number of positions of said controller and a second of said contacts connecting said valve device for energization in a second predetermined number of positions of said controller, a latching device arranged when energized to permit said controller to advance one position, first speed responsive means arranged to energize said latching device responsive to a predetermined speed of said auxiliary prime mover, second speed responsive means arranged to energize said latching device responsive to a first predetermined speed of said main prime mover, and third speed responsive means arranged to de-energize said circuit establishing device to disconnect said auxiliary generator from said main generator responsive to a second predetermined speed of said main prime mover.

20. A system for starting and shutting down a main thermal prime mover having a main generator mechanically connected thereto comprising an auxiliary thermal prime mover mechanically connected to drive an auxiliary generator, a source of fuel for said main prime mover, means for starting said auxiliary prime mover, first circuit establishing means arranged electrically to connect said auxiliary generator to said main generator for operating the same as a motor to crank said main prime mover, valve means arranged to connect said main prime mover to said source of fuel, speed responsive circuit establishing means arranged to disconnect said auxiliary generator from said main generator responsive to predetermined speed of said main prime mover, and supervisory control means arranged sequentially to actuate said starting, first circuit establishing and valve means for starting said main prime mover and to deactuate said last-enumerated means in reverse sequence for shutting down said main prime mover.

21. A system for starting and shutting down a main thermal prime mover having a main generator mechanically connected thereto comprising auxiliary thermal prime mover mechanically connected to drive an auxiliary generator, a source of fuel for said main prime mover, operating means connected when energized to start and run said auxiliary prime mover, an operating device connected when energized to start and run said auxiliary prime mover, a circuit establishing device arranged when energized to connect said auxiliary generator to said main generator for operating the same as the motor to crank said main prime mover, a valve device arranged when energized to connect said source of fuel to said main prime mover, a circuit controller having a plurality of contacts for sequentially connecting said devices for energization to start said main prime mover and for disconnecting said devices in a reverse sequence for shutting down said main prime mover, one of said contacts connecting said operating device for energization in a first predetermined number of positions of said controller, a second of said contacts connecting said circuit establishing device for energization in a second predetermined number of positions of said controller, and a third of said contacts connecting said valve device for energization in a third predetermined number of positions of said controller, and speed responsive means arranged to de-energize said circuit establishing device responsive to the predetermined speed of said main prime mover.

22. A system for starting and shutting down a main thermal prime mover having a main generator mechanically connected thereto comprising an auxiliary thermal prime mover mechanically connected to drive an auxiliary generator, a source of fuel for said main prime mover, means for starting said auxiliary prime mover, first circuit establishing means arranged electrically to connect said auxiliary generator to said main generator for operating the same as a motor to crank said main prime mover, valve means arranged to connect said main prime mover to said source of fuel, and speed responsive circuit establishing means arranged to disconnect said auxiliary generator from said main generator responsive to a predetermined speed to said main prime mover.

23. A system for starting and shutting down a main thermal prime mover having a main generator mechanically connected thereto comprising an auxiliary thermal prime mover mechanically connected to drive an auxiliary generator, a source of a first type fuel for said main prime mover, a source of second type fuel for said main prime mover, means for starting said auxiliary prime mover, first circuit establishing means arranged electrically to connect said auxiliary generator to said main generator for operating the same as a motor to crank said main prime mover, first valve means arranged to connect said source of said first type of fuel to said main prime mover, speed responsive circuit establishing means arranged to disconnect said auxiliary generator from said main generator responsive to a predetermined speed of said main prime mover, and second valve means arranged to connect said source of said second type of fuel to said main prime mover.

24. A system for starting and shutting down a main thermal prime mover having a main generator mechanically connected thereto comprising an auxiliary thermal prime mover mechanically connected to drive an auxiliary generator, a source of fuel for said main prime mover, a battery, means for starting said auxiliary prime mover, first circuit establishing means arranged when actuated so electrically connect said auxiliary generator to said main generator for operating the same as a motor to crank said main prime mover and when deactuated to connect said auxiliary generator to said battery for charging, valve means arranged to connect said source of fuel to said main prime mover, and speed responsive circuit establishing means arranged to deactuate said first circuit establishing means to disconnect said auxiliary generator from said main generator and to reconnect said auxiliary generator to said battery responsive to a predetermined speed of said main prime mover.

25. A system for starting and shutting down a main thermal prime mover having a main generator mechanically connected thereto comprising a first auxiliary generator mechanically connected to said main prime mover, an auxiliary thermal prime mover mechanically connected to drive a second auxiliary generator, a battery, a source of fuel for said main prime mover, operating means arranged when actuated to start and run said auxiliary prime mover and when deactuated to stop the same, first circuit establishing means arranged when actuated to electrically connect said second auxiliary generator to said main generator for operating the same as a motor to crank said main prime mover and when deactuated to connect said second auxiliary generator to said battery for charging, valve means arranged to connect said source of fuel to said main prime mover, speed responsive circuit establishing means arranged to deactuate said first circuit establishing means to disconnect said second auxiliary generator from said main generator and to reconnect said second auxiliary generator to said battery responsive to a predetermined motor speed, and second circuit establishing means arranged to disconnect said second auxiliary generator from said battery and to connect said first auxiliary generator thereto.

CARL A. BRANCKE.

References Cited in the file of this patent

UNITED STATES PATENTS

| Number | Name | Date |
|---|---|---|
| 1,159,521 | Heany | May 18, 1915 |
| 1,356,065 | Heinze | Oct. 19, 1920 |
| 1,409,736 | Lea | Mar. 14, 1922 |
| 2,298,309 | Ray | Oct. 13, 1942 |
| 2,405,676 | Strub | Aug. 13, 1946 |
| 2,503,289 | Nettel | Apr. 11, 1950 |
| 2,624,849 | Bennett-Powell | Jan. 6, 1953 |